(12) United States Patent
Suresh et al.

(10) Patent No.: US 10,798,466 B2
(45) Date of Patent: Oct. 6, 2020

(54) METHOD AND APPARATUS FOR IMPROVING OVER THE TOP (OTT) DELIVERY OF INTERACTIVE ADVERTISEMENTS

(71) Applicant: ARRIS Enterprises LLC, Suwanee, GA (US)

(72) Inventors: Sandeep Guddekoppa Suresh, Bangalore (IN); Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/209,893

(22) Filed: Dec. 4, 2018

(65) Prior Publication Data
US 2019/0174203 A1    Jun. 6, 2019

Related U.S. Application Data

(60) Provisional application No. 62/594,387, filed on Dec. 4, 2017.

(51) Int. Cl.
| | |
|---|---|
| *H04N 21/262* | (2011.01) |
| *H04N 21/433* | (2011.01) |
| *H04N 21/435* | (2011.01) |
| *H04N 21/478* | (2011.01) |
| *H04N 21/81* | (2011.01) |
| *H04N 21/8543* | (2011.01) |
| *H04N 21/8547* | (2011.01) |
| *H04N 21/858* | (2011.01) |
| *H04N 21/431* | (2011.01) |

(52) U.S. Cl.
CPC ..... *H04N 21/812* (2013.01); *H04N 21/26241* (2013.01); *H04N 21/435* (2013.01); *H04N 21/4316* (2013.01); *H04N 21/4331* (2013.01); *H04N 21/4334* (2013.01); *H04N 21/478* (2013.01); *H04N 21/8547* (2013.01); *H04N 21/8586* (2013.01); *H04N 21/8543* (2013.01)

(58) Field of Classification Search
CPC ............. H04N 21/812; H04N 21/8543; H04N 21/4316; H04N 21/435; H04N 21/478
See application file for complete search history.

(56) References Cited

U.S. PATENT DOCUMENTS

| | | | |
|---|---|---|---|
| 2013/0007576 A1* | 1/2013 | Lund | H04N 21/4307 715/203 |
| 2013/0007799 A1* | 1/2013 | Sandoval | H04N 21/237 725/32 |
| 2014/0181947 A1* | 6/2014 | Lund | H04L 63/08 726/9 |
| 2015/0201227 A1* | 7/2015 | Krasko | H04N 21/2668 725/34 |
| 2017/0180814 A1 | 6/2017 | Stathacopoulos et al. | |
| 2017/0195748 A1 | 7/2017 | Shkedi et al. | |

* cited by examiner

*Primary Examiner* — Hsiungfel Peng
(74) *Attorney, Agent, or Firm* — Buchanan Ingersoll & Rooney PC (57) ABSTRACT

A simplified HTML based video advertisement delivery which can be employed by receivers using existing data protocols such as simple HTML text tracks is disclosed. Text tracks are used as a trigger to launch interactive video advertisements, then advertisement delivery is managed with reduced system load. This ameliorates the "load time" problem and can also be used to allow the user to interact with the advertisement for an extended time.

16 Claims, 9 Drawing Sheets

METHOD AND APPARATUS FOR IMPROVING OVER THE TOP (OTT) DELIVERY OF INTERACTIVE ADVERTISEMENTS

CROSS-REFERENCE TO RELATED APPLICATIONS

This application claims benefit of U.S. Provisional Patent Application No. 62/594,387, entitled "A METHOD TO DELIVER AND IMPROVE "OVER THE TOP" (OTT) INTERACTIVE ADVERTISEMENT FOR CONTENT BROADCAST OR STREAMING," by Sandeep Suresh and Krishna Prasad Panje, filed Dec. 4, 2018, which application is hereby incorporated by reference herein.

1. FIELD

The present disclosure relates to systems and methods for providing media programs, and in particular to a system and method for providing interactive advertisements with such media programs.

2. DESCRIPTION OF THE RELATED ART

The dissemination and playback of media programs has undergone substantial changes in the past decade. Previously, media programs (which may include audio, video, or both) were disseminated either by analog broadcast (conventional, satellite, or cable) or by dissemination of films to movie theaters. These traditional dissemination and playback means remain in use after the advent of digital technology. However, digital technologies have had a profound effect on the dissemination and playback of media programs.

Digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

"Over the Top" (OTT) dissemination of media programs refers to a process by which content providers distribute media programs in streaming media form as a standalone product directly to viewers over the Internet, bypassing telecommunications, multichannel television and broadcast television previously used to disseminate media programs. Typically, such programs are streamed over the public Internet to general processing devices (e.g. computers and smartphones), rather than a closed, private network using proprietary equipment such as set-top-boxes.

In traditional pay television (e.g. cable and satellite), advertisements are inserted as either part of the channel (or PMT) itself or it is transmitted over a different channel coming over the same or different transport stream (TS). Upon reaching the splice point or external advertisement trigger, the platform (e.g. receiver) or application executing on the processing device either splices the PID of the advertisement or tunes to the channel which contains the advertisement. Such advertisements are non-interactive (e.g. the user simply views the advertisement and cannot interact with it using the receiver or application.

HTML5 standard and browser capabilities can be used to insert OTT interactive ads developed using HTML5 and related web technologies into media program content. It also allows the user to interact with the advertisement with extended period of time. This insertion is can be accomplished, for example, by including advertisement URL/playlists/video tracks etc. (fetched by the browser app on the device) in the presented information.

However, there are problems with the downloading and presentation of interactive advertisements. One difficulty is that the receiver must load the interactive contents (such as drop down items and scripts) and the video portion of the advertisement itself before presenting the interactive advertisement. This "load time" can be in the order of seconds, which, in some circumstances, is excessive, particularly if the advertisement is a targeted advertisement (TAD) that requires the use of profile data. Another difficulty is that the user may limit their interaction with the advertisement so that they can return to the media program in a timely manner so that they do not miss the portion of the media program being streamed while they are engaged with the interactive advertisement.

Accordingly, there is a need to reduce advertisement load time and management overhead, and to allow the user to interact with the advertisement for extended periods of time while also viewing the entire media program.

SUMMARY

To address the requirements described above, this document discloses a system and method for presenting an advertisement. In one embodiment, the method comprises receiving a video element of a media program having a metadata text track. The metadata text track includes a preload cue, having a preload cue start time at which the advertisement is to be loaded for later presentation and a link to the advertisement. The show cue has a show cue start time at which the advertisement is to be presented. The method further comprises providing the media program for display, then determining when a current time of the video element reaches the preload cue start time. When the current time of the video element reaches the preload cue start time, the advertisement is retrieved and preloaded according to the link to the advertisement without providing the preloaded advertisement for display. The method further determines when the current time of the video element reaches the show cue start time, and when the current time of the video element reaches the show cue start time, further determines if the advertisement has been preloaded. If the advertisement has been preloaded, providing the preloaded advertisement for display and if the advertisement has not been preloaded, loading the advertisement according to the link to the advertisement and providing the advertisement for display. Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

Described below is a simplified HTML based video advertisement delivery which can be employed by receivers using existing data protocols such as simple HTML text tracks. Text tracks are used as a trigger to launch interactive video advertisements, then advertisement delivery is managed with reduced system load. This ameliorates the "load time" problem and can also be used to allow the user to interact with the advertisement for an extended time.

The advertisement is delivered using two different cue points that are delivered as HTML text tracks. The first cue point is a "preload" cue point and the next cue point is a "show" cue point. Both cue points include the valid time and the HREF to the web content/scripts of advertisement source if needed. HREFs are attributes of an anchor tag, which is used to identify sections within a document. HREFs include a first component, which is the actual link to the component (e.g. uniform resource locator or URL) and the second component, which is user selectable text known as "anchor text."

A web application executing on the client (such as STB) monitors for the cue points. If the cue point is "preload" cue, the web application loads the web resource or video and keeps the loaded web resource of video in the background. The web application shows the video/web content when the client STB receives the "show" cue text track. With this approach, cue points can be delivered ahead in time and the STB is enabled to process "preload" cue items before a session. The cue points can also be updated periodically if needed. The result is significant improvement in web content and video load and display time with perceptible reduction in lag. The video results are uploaded for a reference (links are mentioned in this doc end).

Content Delivery System

Figure 1:
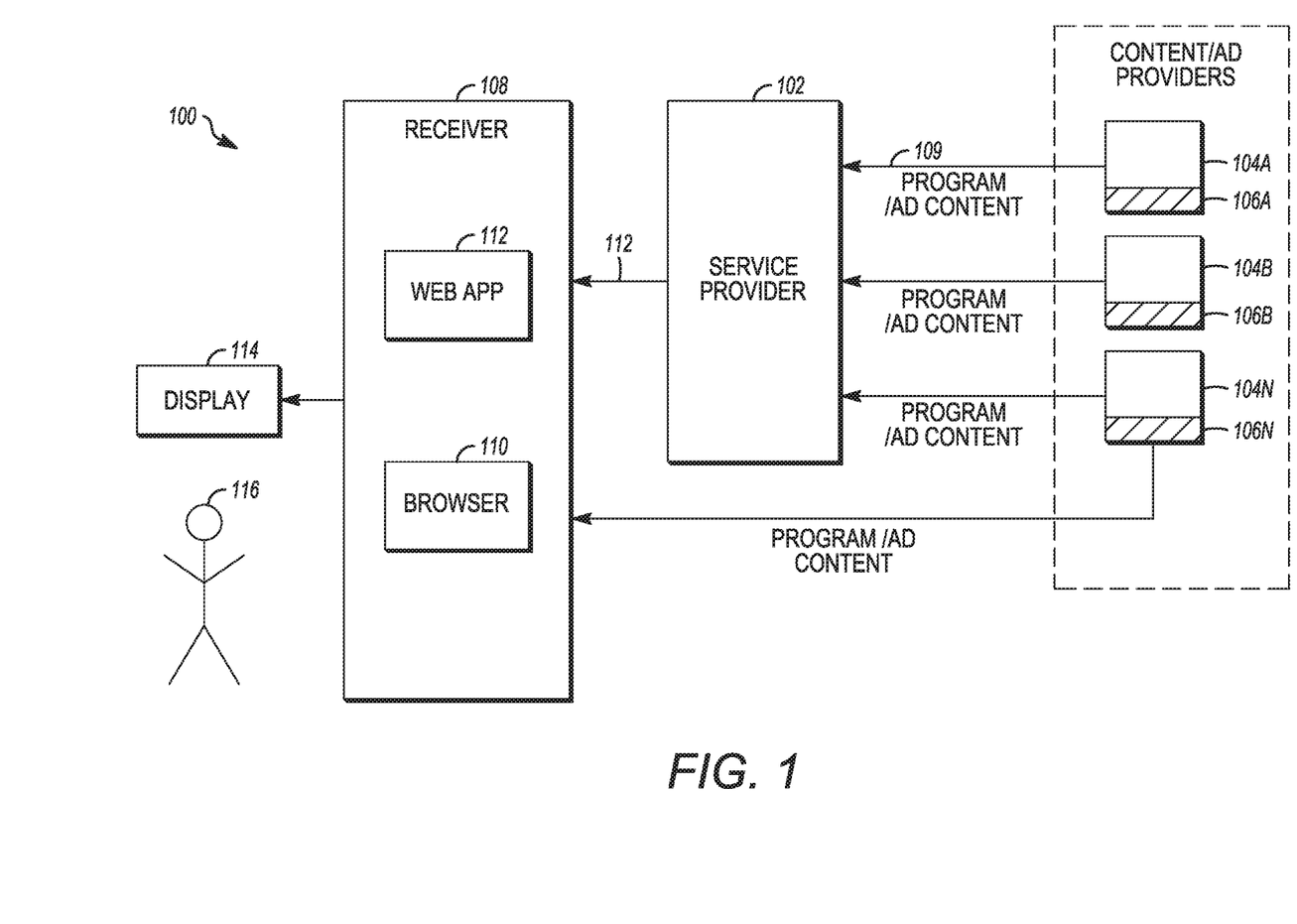
FIG. 1 is a diagram illustrating an exemplary prior art content delivery system.

FIG. 1 is a diagram illustrating an exemplary prior art content delivery system (CDS) 100. The CDS 100 comprises one or more (N) content providers 104A-104N (e.g. FX, HBO, etc., hereinafter alternatively referred to as content provider(s) 104), who each provide one or more media programs for viewing by users 116 by use of one or more receivers 108 in communication with the service provider 102. Typically, the content providers 104 either produce the provided media programs contract with other content providers, such as movie studios and the like) to obtain the rights to copy and distribute such media programs to users 116 for a fee. In a traditional CDS 100, the content providers 104 provide the content to the users 116 via one or more service providers 102, such as TIME WARNER cable, or DIRECTV. The service provider 102 contracts with one or more content providers 104, paying fees to those content providers 104 to obtain feeds 109 of the media programs, so that such feeds 109 can be distributed to users 116. The provision of such media programs to users 116 is typically premised on a fee paid to the service provider 102 by the user 116 for such services. The service provider 102 may provide the media programs to users 116 by use of service provider applications and interfaces or content provider 104 applications and interfaces. When provided over traditional communication channels, the receiver comprises a set-top-box (STB) or integrated receiver/decoder (IRD), which is an electronic device specifically designed for the purpose of receiving such signals, decrypting and decoding them, and providing the decrypted and decoded signals for presentation on a communicatively coupled or integrated display 114. In such applications, the receiver 108 may also comprise a means for recording media programs such as a digital video recorder (DVR). Such DVRs typically permit recording multiple channels at one time and permit the recording of one or more channels of information while concurrently recording information on one or more other channels.

Alternatively or in addition to such delivery of media programs service providers 102 and content providers 104 may distribute streaming media as a standalone product directly to the receivers 108 via the Internet, thus bypassing traditional telecommunications systems such as multichannel broadcast television via satellite or cable. Such delivery is known as "over the top" (OTT) and is most synonymous with subscription-based video on demand services. Such services are currently provided by HULU, NETFLIX, and others. Smaller scale television services that offer access to live streams of specialty channels similar to traditional satellite or cable television providers, but streamed over the public Internet rather than a closed private network.

In OTT embodiments, the receiver 108 typically comprises a processing device such as a computer implementing a browser 110 and a web application 112, as well as via applications on mobile devices such as smartphones and tablets, digital media players and smart television platforms.

HTML5 Enabled Receivers

In one embodiment, the receiver 108 is an HTML5-enabled receiver (for example, set top boxes such as those available from the ARRIS corporation), and the broadcast channels are tuned using an HTML5 video tag. An "src" attribute of the video element is set to the URL of the channel to be tuned. A unique URL scheme is used for the broadcast channel. The browser 110 passes the URL to a backend executing in the receiver 108 (KA middleware) for tuning to the channel, processing the received information, and providing the processed information to the display 114 for presentation. An exemplary command is presented below:

```
var vid = document.getElementById('video');
vid.src = "atsc://530000.256.1"
vid.play( );
```

An HTML video element is element of code that specifies a standard way to embed a video in a web page. It typically specifies the width and height of the video window, as well as one or more sources of the video. The video element may also include a controls attribute that adds user selectable controls such as play, pause and volume. An example of such a video element is presented below:

```
<video width="320" height="240" controls>
    <source src="movie.mp4" type="video/mp4">
    <source src="movie.ogg" type="video/ogg">
</video>
```

Typically, a video element comprises one video track and one or more audio tracks. HTML5 specifies another type of track known as text tracks. There are five different types (e.g. kinds) of text tracks: subtitles, captions, chapters, descriptions and metadata. Below is an example of a video element having a text track that is a subtitle text track.

```
<video width="320" height="240" controls>
    <source src="forrest_gump.mp4" type="video/mp4">
    <track src="subtitles_en.vtt" kind="subtitles" srclang="en" label="English">
</video>
```

The HTML5 text tracks may comprise one or more cues. Each cue has timing information indicating when the cue starts and when it ends. Each cue can have additional data based on the text track type. For example, a plaintext representation of a text track having two cues is presented below:

```
Id1
00:00:10.000→00:00:11.600
This is plaintext, and can be json data also!
```

Text tracks may also be represented by javascript object notation (JSON), as shown below

```
Id2
00:00:14.500→00:00:15.500
{
    "dataType":"json",
    "purpose": "example"
}
```

A cue comprises a cue identifier (ID), timing information, and a cue body. The cue ID (Id1 and Id2 in the above example) is used to uniquely identify the cue inside the text track. The timing information (typically represented as startTime (hh:mm:ss)→enTime(hh:mm:ss) defines the cue start and cue end times. The body of the cue may comprise plain text, a JSON structure or a markup, and is visible to end user in the text tracks of type subtitle/captions/descriptions/chapters. If the text track is of the metadata type, the body comprises scripts meant for consumption by the receiver 108.

Each cue is separated by a new line. The browser 110 triggers an enter (onenter()) callback when the currentTime of the video playback reaches the cue start time (ex: 00:00:10:000) and triggers an exit (onexit()) callback when the currentTime of the video playback reaches the cue end time (ex: 11:00:11:600).

Using Text Tracks of Type "Metadata" to Insert
OTA Ads into Broadcast Content Tuned Using
HTML 5 Video Tags A text track may be defined that carries information about the advertisement and the timing for presenting the advertisement. An example of a basic metadata text carrying an advertisement is provided below. In this example, Ad1, Ad2, . . . represents the ID of the respective advertisement(s), the "description" field gives details of the respective advertisement, and the lire field provides the URL of the advertisement that must be loaded by web application to play/display the advertisement.

```
Ad1
00:00:10:00 → 00:00:12:00
{
    "description" : "Automobile advertisement",
    "ad-type" : "interactive",
    "href" : "https://adserver/autoAdd1.html"
}
Ad2
00:00:20:00 → 00:00:22:00
{
    "description" : "Mobile handset advertisement",
    "ad-type" : "non-interactive",
    "href" : "https://adserver3pp/mobileAdd1.html"
}
```

Above metadata text track can be further enhanced to include a cue-type of text track which carries information on whether the advertisement (or href) has to be loaded and displayed immediately or just loaded for later display, as shown below:

```
PreloadAd1
00:00:9:50 --> 00:00:9:55
{
    "cue-type" : "preload",
    "description" : "Automobile advertisement",
    "ad-type" : "interactive",
    "href" : "https://adserver/autoAdd1.html"
}
Ad1
00:00:10:00 --> 00:00:12:00
{
    "cue-type" : "show",
    "description" : "Automobile advertisement",
    "ad-type" : "interactive",
    "href" : "https://adserver/autoAdd1.html"
}
PreloadAd2
00:00:19:50 --> 00:00:19:55
{
    "cue-type" : "preload"
    "description" : "Mobile handset advertisement",
    "ad-type" : "non-interactive",
    "href" : "https://adserver3pp/mobileAdd1.html"
}
Ad2
00:00:20:00 --> 00:00:22:00
{
    "cue-type" : "show"
    "description" : "Mobile handset advertisement",
    "ad-type" : "non-interactive",
    "href" : "https://adserver3pp/mobileAdd1.html"
}
```

The preload cue allows web application 112 to load the advertisement referenced by the URL and ready it for display but not display the advertisement until the cue of type "show" is entered, at which time, the pre-loaded advertisement is displayed.

To implement this features, it is useful to open a browser 110 window in the background without presenting the window itself until the proper time. This technique is discussed below:

Browser Interface for Opening a Window in the Background

Importantly, the current state of the web application 112 is not disturbed when advertisement is loaded for displaying, and the loading and displaying of the advertisement itself is seamless, with the user 116 unaware advertisement being pre-loaded in the background.

In one embodiment, this is accomplished by loading the advertisement in a different window of the browser 110 than the browser window being used to present the media program. Further, to make the transition from content to advertisement seamless in appearance to the user, the web application 112 preloads the advertisement and displays the advertisement only when "show" cue is entered.

In one embodiment, the web application 112 includes support from the receiver 108 platform to open a window, load the URL but not display it, and this is accomplished by allowing the a receiver backend to expose application program interfaces (APIs) to open, load, display, hide and close browser windows through a browser 110 plugin. Standard window.open and window.close application program interfaces (APIs) cannot be used as the window.open API always displays pages immediately when loading is completed. In KA platforms of the ARRIS products referred to above, the APIs exposes the APIs through a tab manager NJSE/JSPP plugin.

Synchronizing Program Time and the Current Time of Video Elements

The use of cue timing is complicated by the fact that the user 116 many not always watch a media program from the beginning of the media program (e.g. time: 00:00:00:000). For example, the user may tune to the channel of interest twenty minutes after the streaming of a live media program has begun. For example, assume that a program begins at time 10:00:00:000, and the user tunes to the program at 10:20:00:000. In such cases, synchronization of time between the video/audio tracks and the metadata text track are taken into account. The currentTime of the video element starts from 00:00:00:000, and the metadata text tracks are based on relative time, which starts from 00:00:00:000. Since twenty minutes of the media program is already complete, the currentTime should have started from 00:20: 00:000. To account for this difference, the currentTime of the video is set to 00:20:00:00 by the backend using the program guide data or program information messages included in the program stream such as like DCII PIT (Program Information Table) or the PTS (program time stamp).

Process Overview

An overview of the process or presenting interactive advertisements is provided as follows. First, an appropriate metadata text track carrying the advertisement information is inserted or added to the video tag. A web application 112 executing on a receiver 108 subscribes to the cue onenter and onexit events, and waits for such events for the duration of the media program associated with the interactive advertisements. Upon receiving an onenter event, the web application 112 retrieves the JSON structure from the metadata text track associated with the cue event. The web application 112 checks the cue type to determine if it is a "pre-load" cue or a "show" cue. If it is a pre-load cue, the web application 112 opens a browser 110 advertisement window, and in the background, loads the information at the URL specified in the HREF, but does not display the window. The web application 112 then waits for another onenter event. Upon receiving another onenter event, the web application 112 again checks to determine if the cue type is a pre-load cue or a show cue. If the cue type indicates it is a show cue and the information at the URL is already preloaded, the web application 112 switches to the browser 110 advertisement window opened with the pre-load cue without having to load the advertisement (since it has been pre-loaded). If the cue type is "show" and the information at the URL is not preloaded, a browser 110 advertisement window is created, the advertisement information at the URL is loaded, and the advertisement is presented in the browser 110 advertisement window.

In either case (whether the advertisement is preloaded or not) the web application 112 determines whether the advertisement is an interactive advertisement (of type "interactive" or "non-interactive). If the advertisement type is non-interactive, the web application 112 displays the browser 110 advertisement window, while continuing to monitor events. When an onexit event occurs, the web application 112 switches back to web application 112 browser 110 window (presenting the media program and user interfaces) and closes the browser 110 advertisement window.

If the ad-type is 'interactive' the web application 112 starts a count-down timer indicating how much time is remaining for the user 116 to interact with the interactive advertisement. An option is provided to the to user 116 to continue interactive with the interactive advertisement beyond end of cue (the onexit event for the interactive advertisement). For example, the web application 112 may present an interface instructing the user 116 to activate a control of the user interface to continue interacting. If user 116 decides to continue interacting with the advertisement, the web application 112 continues to present the interactive advertisement in the browser 110 advertisement window even after receiving onexit event and provides an option for the user 116 to exit the interactive advertisement at a later time. Concurrently, the web application 112 initiates recording the associated media program (which has recommenced) in the background. When user exits the interactive advertisement, the web application 112 begins playing back the recorded media program from the onexit event time, so that the user 116 doesn't miss any of the media program. If user 116 decides not to interact with the interactive advertisement, the web application 112 displays the broadcast program by switching to web application 112 window and close the browser 110 advertisement window.

FIGS. 2A-2E are diagrams illustrating an exemplary process for presenting advertisements. In block 202, a video element of a media program having a video track, an audio track, and a metadata text track is received, and in block 204, the media program is provided for display. In one embodiment, the media program is presented in a first browser window.

Figure 2A:
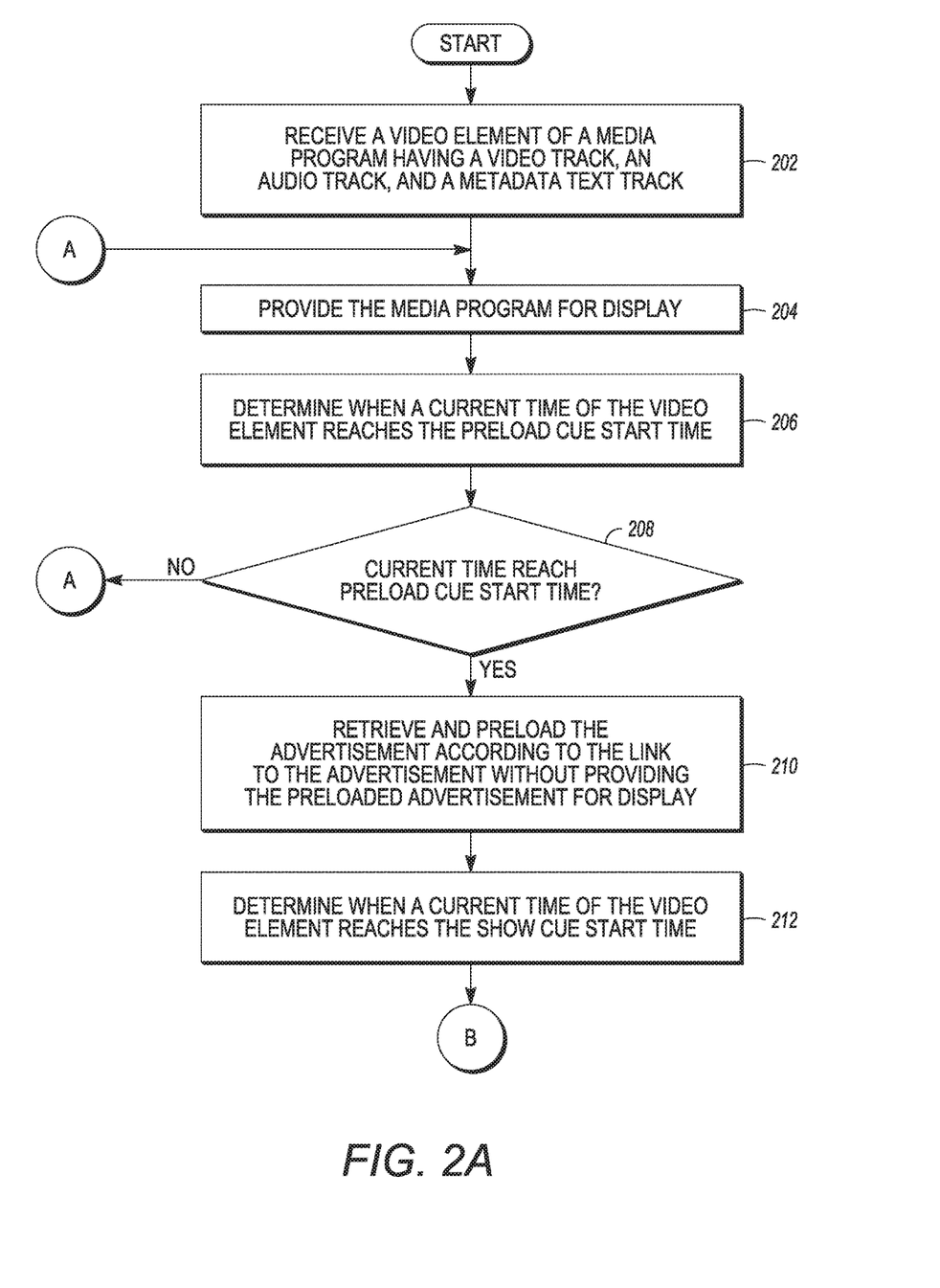
FIGS. 2A-2E are diagrams illustrating an exemplary process for presenting advertisements.

The metadata text track includes at least two cue types—a preload cue and a show cue, and the type of cue is indicated in the metadata text track. The preload cue has a preload cue start time at which the advertisement is to be loaded for later presentation, and a link (e.g. URL) to the advertisement. The show cue has a cue start time at which the advertisement is to be presented. If the advertisement is an advertisement that was preloaded, no further information is necessary, but if the show cue refers to an advertisement that has not been preloaded, a link to the advertisement is also provided so that the advertisement can be retrieved.

Returning to FIG. 2A, the web application 112 determines when a current time of the video element reaches the preload start time. If the preload start time has not been reached, processing is returned to block 204 to continue providing the media program for display. If the preload time has been reached, processing is routed to block 210. These operations are illustrated in blocks 206 and 208.

Figure 2B:
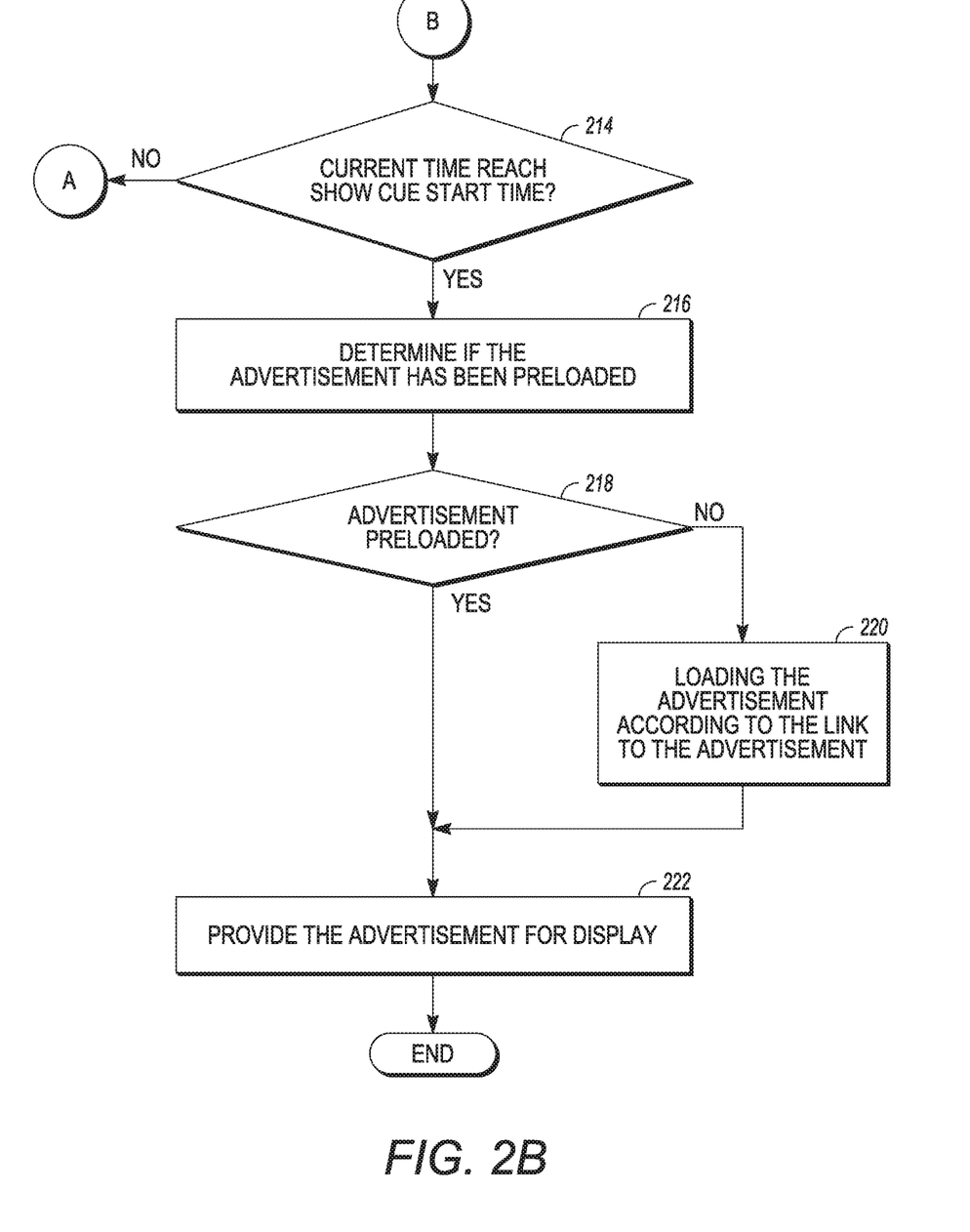
Figure 2C:
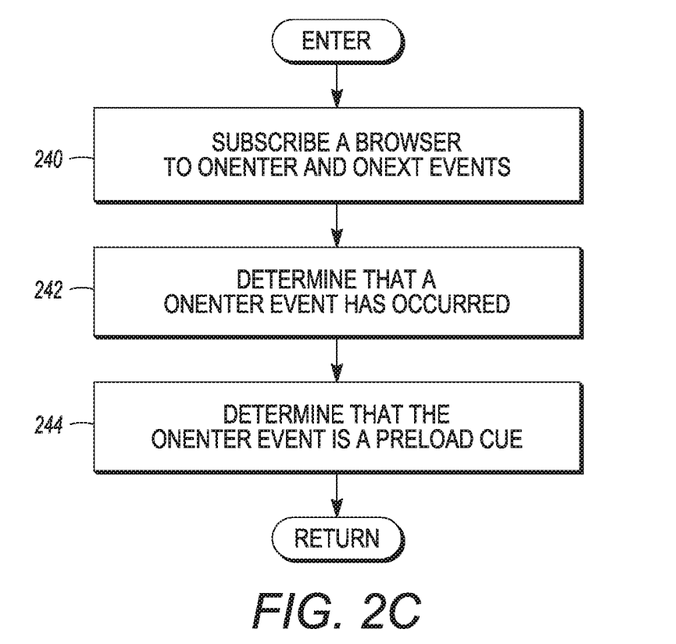

FIG. 2C is a diagram illustrating exemplary operations for performing the foregoing process steps. Block 240 subscribes the browser to onenter and onexit events. Monitoring such events, block 242 determines that a onenter event has occurred, and block 244 determines that the onenter event is a preload cue.

Returning to FIG. 2A and referring to FIG. 2B, if the current time has reached the preload cue time, block 210 retrieves and preloads the advertisement according to the link provided in the preload cue, as shown in block 210. This preload operation is performed in the background, and without providing the preloaded advertisement for display. In one embodiment, this is accomplished by opening, but not displaying a second browser window.

Figure 2D:
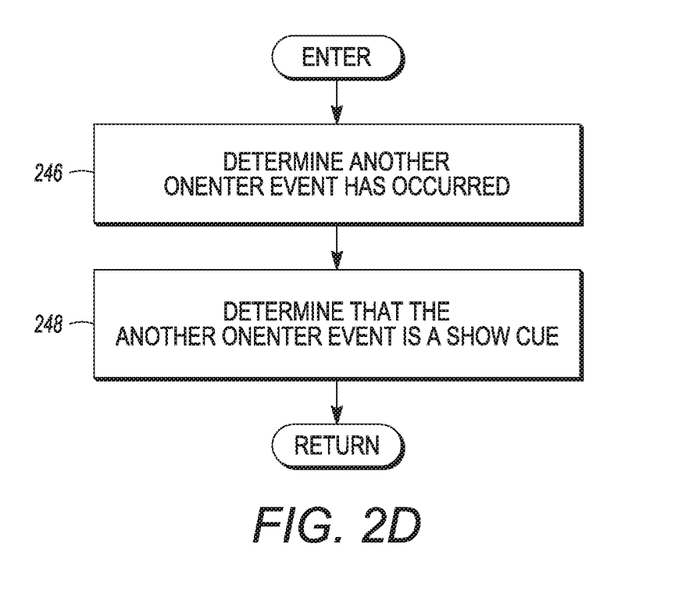

Blocks 212 and 214 determine when a current time of the video element reaches the show cue start time. If the current time of the video element has not reached the show cue start time, processing is routed back to block 204 to continue providing the media program for display. If blocks 212 and 214 determine that the current time of the video element reaches the show cue start time, processing is routed to block 216. FIG. 2D is a diagram illustrating exemplary operations for performing the foregoing process steps. Block 246 determines whether another onenter event has occurred, and block 248 determines that the another onenter event is as show cue.

Returning to FIG. 2B, block 216 determines if the advertisement has been preloaded. If the advertisement has been preloaded, block 218 routes processing to block 222 which provides the (preloaded) advertisement for display (e.g. by switching to the second window). If the advertisement has not been preloaded, block 218 routes processing to block 220 which loads advertisement according to the link to the advertisement provided in the show cue information, and routes processing to block 222, which provides the (now loaded) advertisement for display.

Figure 2E:
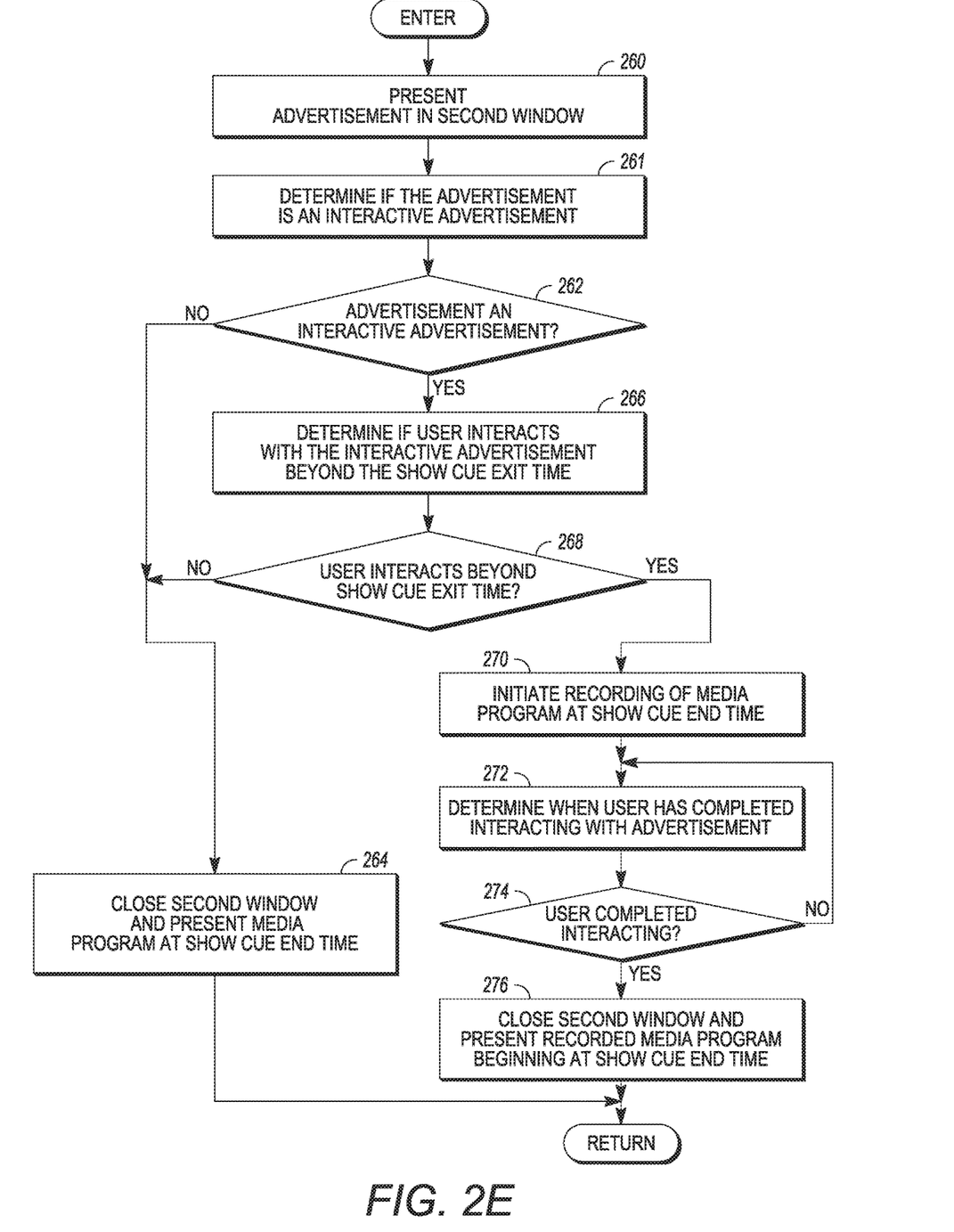

FIG. 2E is a diagram illustrating how the advertisement may be provided for display. In this embodiment, the media program playing when the show cue event was detected was presented in a first browser window, and the advertisement was preloaded using a second browser window. Block 260 presents the advertisement for display in a second window. Block 261 determines if the advertisement is an interactive advertisement. This can be determined, for example by examining the ad-type attribute or tag of the metadata track, as further described below. If the advertisement is not an interactive advertisement (e.g. comprises elements permitting interactivity with the user), processing is routed to block. If the advertisement is not an interactive advertisement, processing is routed to block 264, which closes the second at the show cue end time and closes the second window. If the advertisement is an interactive advertisement, block 262 routes processing to block 266, which determines if the user 116 interacts with the advertisement beyond the show cue exit time. If the user doesn't interact with the interactive advertisement, block 268 routes processing to block 264, which, at the show cue end time, closes the second window and returns to the presentation of the video element or media program. If the user interacts with the interactive advertisement beyond the show que exit time, processing is routed to block 270, which initiates recording of the media program at the show cue end time. Processing is then passed to block 272, which determines when the user has completed interacting with the advertisement. If the user has not completed interacting with the advertisement, processing is routed to block 272. If the user has completed interacting with the advertisement, block 276 routes processing to block 276, in which the second window presenting the interactive advertisement is closed and the recorded media program is presented beginning at the show cue end time. Accordingly, the user 116 can then view the entire media program, including those portions of the media program that began playing after the scheduled end of the interactive advertisement.

Figure 3A:
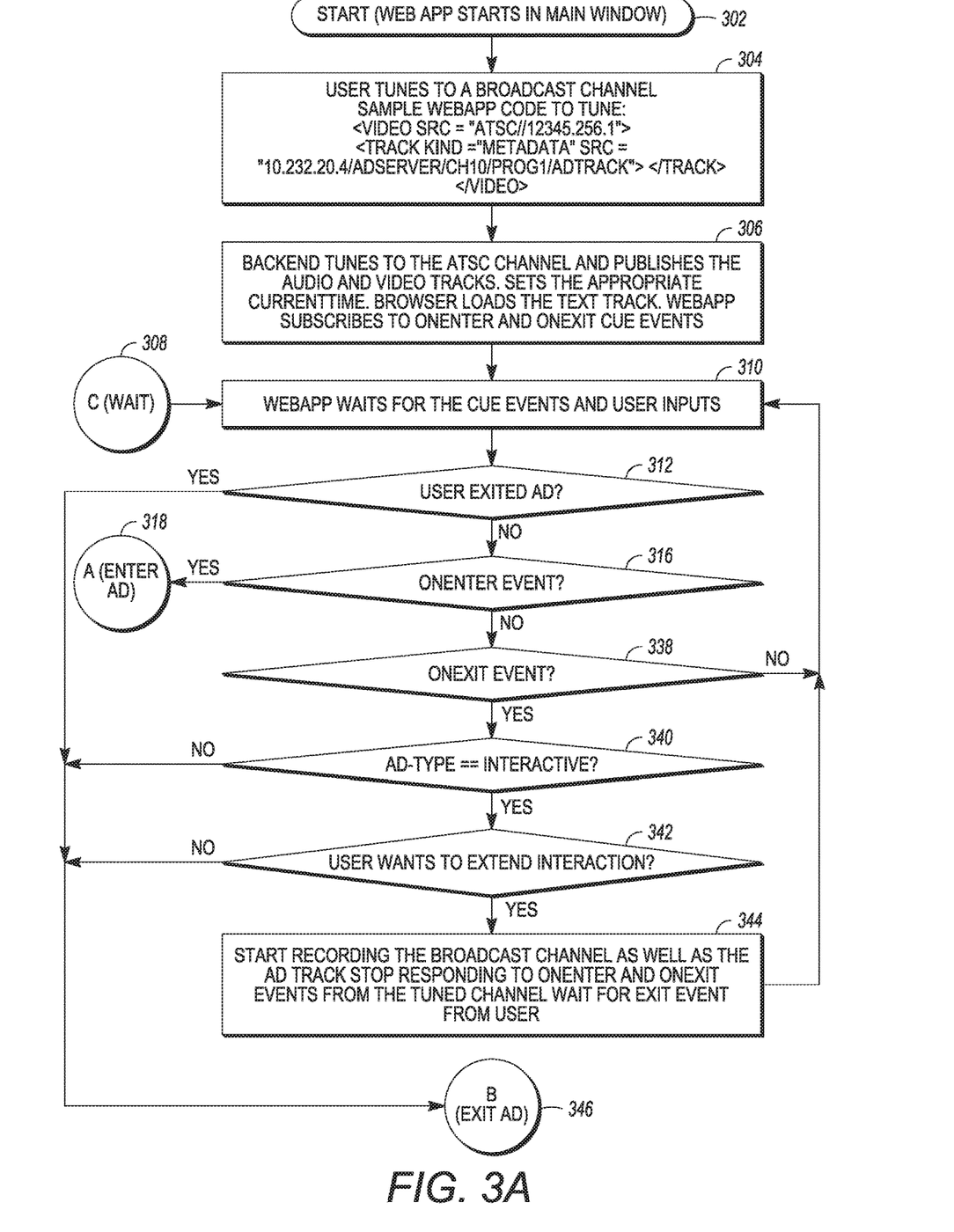
FIGS. 3A-3C are diagrams showing a more detailed representation of the process for presenting advertisements.
Figure 3B:
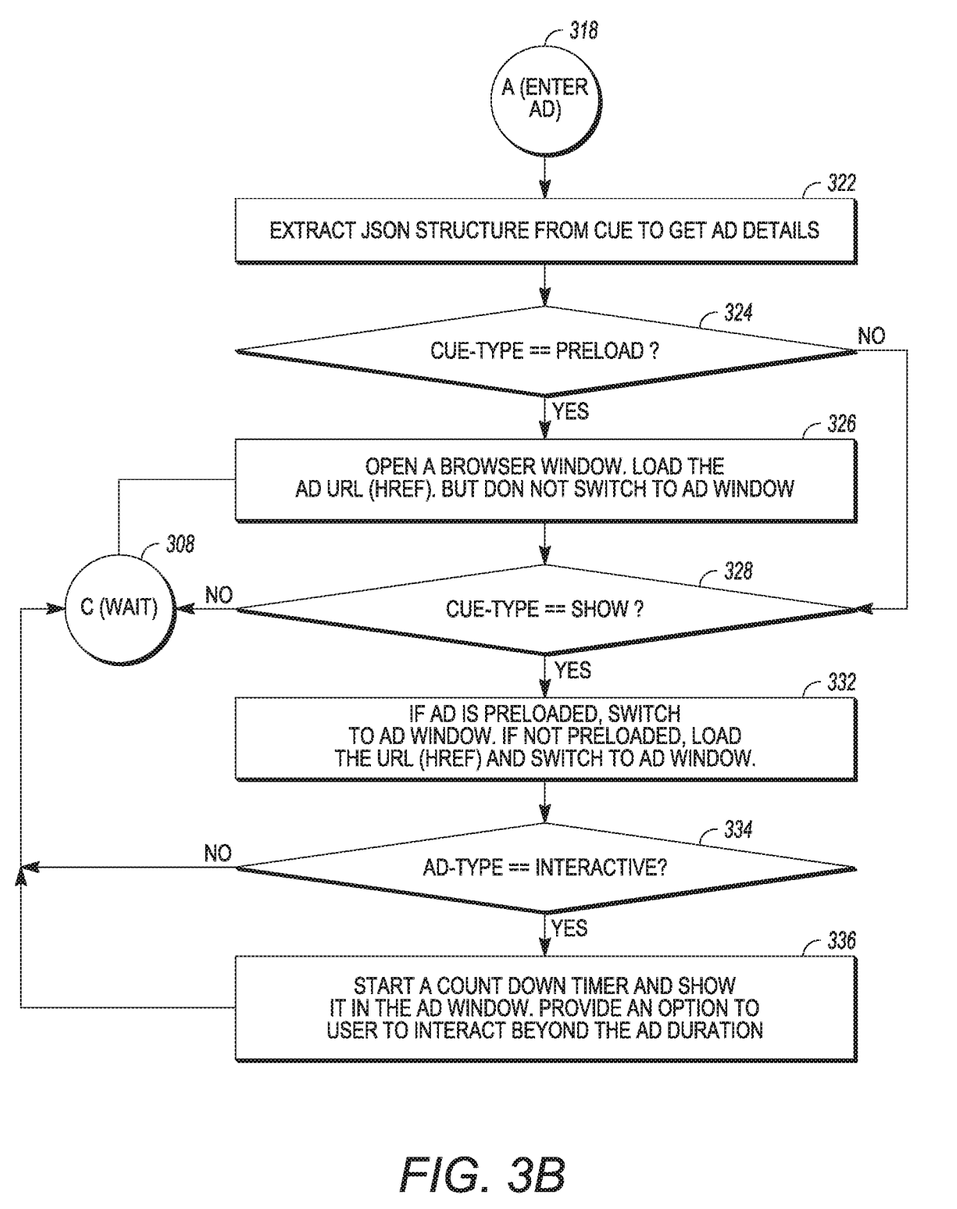
Figure 3C:
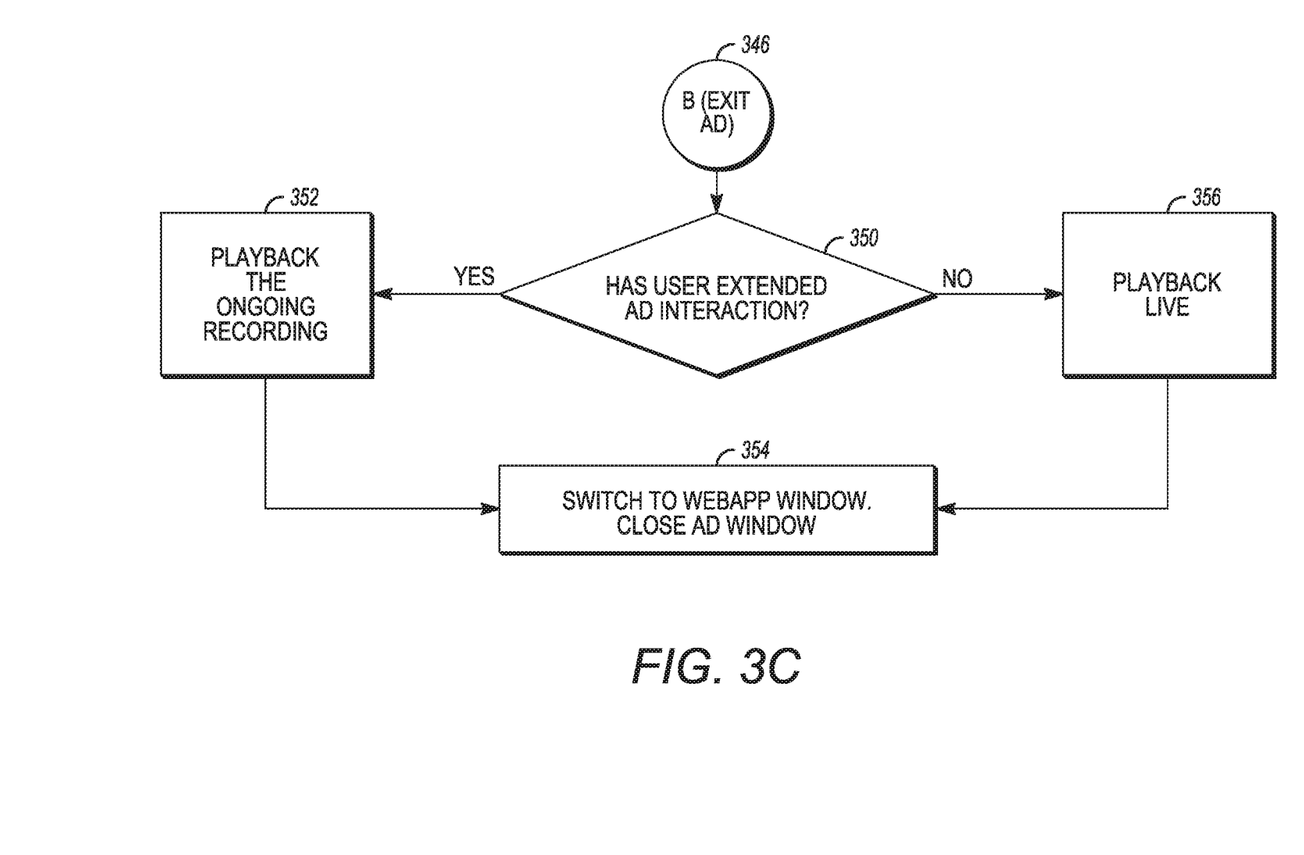

FIGS. 3A-3C are diagrams showing a more detailed representation of the foregoing process for presenting advertisements. In block 302, the web application 112 is started in a primary or main browser window. In block 304, the receiver is tuned to a broadcast channel (e.g. in response to user input). For example, the web application 112 may be instructed to tune to the broadcast channel using the following command:

<video.src = "astc//12345.256.1 ">
<track kind = "metadata" src = "10.232.20.4/adserver/ch10/prog1/adtrack"></track></video>

In block 306, the backend tunes to the Advanced Television Systems Committee (ATSC) transmission channel and publishes the audio and video tracks, while setting the appropriate current time as described above. The web browser 110 loads the text track, and the web application 112 subscribes to onenter and onexit cue events. In block 310, the web application 112 waits for cue events and user input. In block 312, the web application 112 determines if a user input was received indicating that the user exited an advertisement. If no such user input was received, block 316 checks to determine if a onenter event was received. If a onenter event was received, processing is routed to the enter advertisement routine via item 318 as shown in FIG. 3B.

As shown in block 322, the enter advertisement routine extracts the json structure from the cue to obtain the advertisement details, including the cue type and whether the advertisement is interactive or non-interactive. Block 324 determines whether the cue is a preload type. If the cue is a preload type, processing is routed to block 326, which opens an advertisement window in the browser 110, loads the advertisement at the URL (href), but does not switch to the advertisement window. Processing is then routed to item 308, in which the web application 112 waits for cue events and user inputs.

If the cue is not of the preload type, processing is routed to block 328, which determines if the cue is of the show que type. If the cue type is not of the shoe cue type, processing is again routed to item 308. If the cue is of the show type, processing is routed to block 332. Block 332 determines if the advertisement defined in the JSON structure was preloaded. If so, the web application 112 switches to the advertisement window opened in block 326. If not, the web application 112 loads the information at the URL and switches to an advertisement window. Processing is then routed to block 334, which determines whether the advertisement that described in block 332 is an interactive advertisement. If not, processing is routed to item 308. If the advertisement is an interactive advertisement, a count down counter is started and shown in the browser advertisement window. The user 116 is then provided with an option to interact with the advertisement beyond the scheduled advertisement duration. Processing is then routed to item 308 to wait for further cue onenter and onexit events or user inputs.

Block 338 determines if an onexit event has occurred. If not, processing is routed to block 310 and the web application 112 continues to wait for further onenter and onexit events and user inputs. If block 338 determines that an onexit event has occurred, processing is routed to block 340, which determines if the advertisement is of an interactive advertisement type. If the advertisement is not an interactive advertisement, processing is routed to block 312. If the advertisement is an interactive advertisement, processing is routed to block 342, which determines whether the user wants to extend their interaction with the interactive advertisement beyond the end of the advertisement itself (as determined by the onexit event of block 338). If the user 116 provides an input indicating that the user 116 does not want to extend interaction, block 342 routes processing back to block 312. If the user 116 provides an input indicating that the user 116 wants to extend their action with their interaction with the interactive advertisement past the normal termination point of the advertisement, processing is routed to block 344, which starts recording the media program on the ATSC transmission channel that was tuned to, as well as the advertisement track. The web application 112 then ceases responding to the onenter and onexit events from the tuned channel and waits for the exit event from the user (e.g. block 312). When the exit event is sensed, processing is passed to block 346, which exits the interactive advertisement, as shown in FIG. 3C.

Block 350 determines if the user 116 has ended interaction with the interactive advertisement, the ongoing recording of the media program is played back from the beginning of the recording (e.g. beginning from the onexit time of block 338), as shown in block 352. In block 354, the web application 112 switches to the web application 112 window to present the recording, and closes the advertisement window as shown in block 354. If the user 116 has not extended interaction with the interactive advertisement past the onexit time of block 338, the media program is played back beginning at the onexit time and presented in the web application 112 window, and the advertisement window is closed, as shown in blocks 354 and 356.

Choosing Preload Timing Based on Receiver Hardware Capabilities

The time necessary to preload the advertisement can be different for different models and types of receivers. Metadata text tracks can be modified to include not only the cue start and end times, the cue type and the ad-type, but also an indication or identifier of the class or model of receiver that is performs the preload. For example, a metadata text track that requires average receiver capabilities may be defined as follows:

PreloadAd_Average
00:00:19:50 --> 00:00:19:59
{
  "cue-type" : "preload"
  "platform" : "DCX4220"
  "description" : "This cue is applicable only for DCX4220 platform",
  "ad-type" : "interactive",
  "href" : "https://adserver3pp/mobileAdd1.html"
}

Note that in this example, the metadata test track defines a preload cue type for an interactive advertisement, and that the preload process begins at 00:19:50 and must end at 00:19:59. A "platform" attribute indicates that this metadata test track is designed only for a particular receiver model, namely the DCX4220. This receiver model is capable of preloading the advertisement in the allotted 9 seconds. Another metadata text track may be included that is appropriate for receivers capable of preloading the advertisement more rapidly. For example, a metadata test track intended for a FMS2 or VMSP2 model or platform class that is capable of preloading the advertisement in 4 minutes may be defined as follows:

PreloadAd_Fast
00:00:19:55 --> 00:00:19:59
{
  "cue-type" : "preload"
  "platform" : "FMS2, VMSP2"
  "description" : "This cue is applicable only for FMS2 and VMSP2 platform",
  "ad-type" : "interactive",
  "href" : "https://adserver3pp/mobileAdd1.html"
}

The preload cue for a DCX4220 class receiver appears 5 seconds ahead of preload cue of FMS2 class receiver, allowing it additional 5 seconds for loading the ad and keeping it ready for display.

Finally, the metadata text track for showing the advertisement (e.g. having the show cue) may be as illustrated below.

Ad
00:00:20:00 --> 00:00:22:00
{
  "cue-type" : "show"
  "description" : "Mobile handset advertisement",
  "ad-type" : "non-interactive",
  "href" : "https://adserver3pp/mobileAdd1.html"
}

This describes that the advertisement at https://adserver3pp/mobileAdd1.html (a mobile handset advertisement) is a non interactive advertisement (shouldn't it be an interactive advertisement?) that will be shown between times 00:00:20:00 and 00:00:22:00.

The receiver processes the foregoing metadata text tracks and only preloads advertisements on designated for that receiver model or class. For example, the FMS2 class receiver ignores the preload que meant for DCX4220 class receiver and vice versa. This can be accomplished by comparing the information in the metadata text track with receiver type/platform information obtained by the web application, for example using a user agent string.

Hardware Environment

Figure 4:
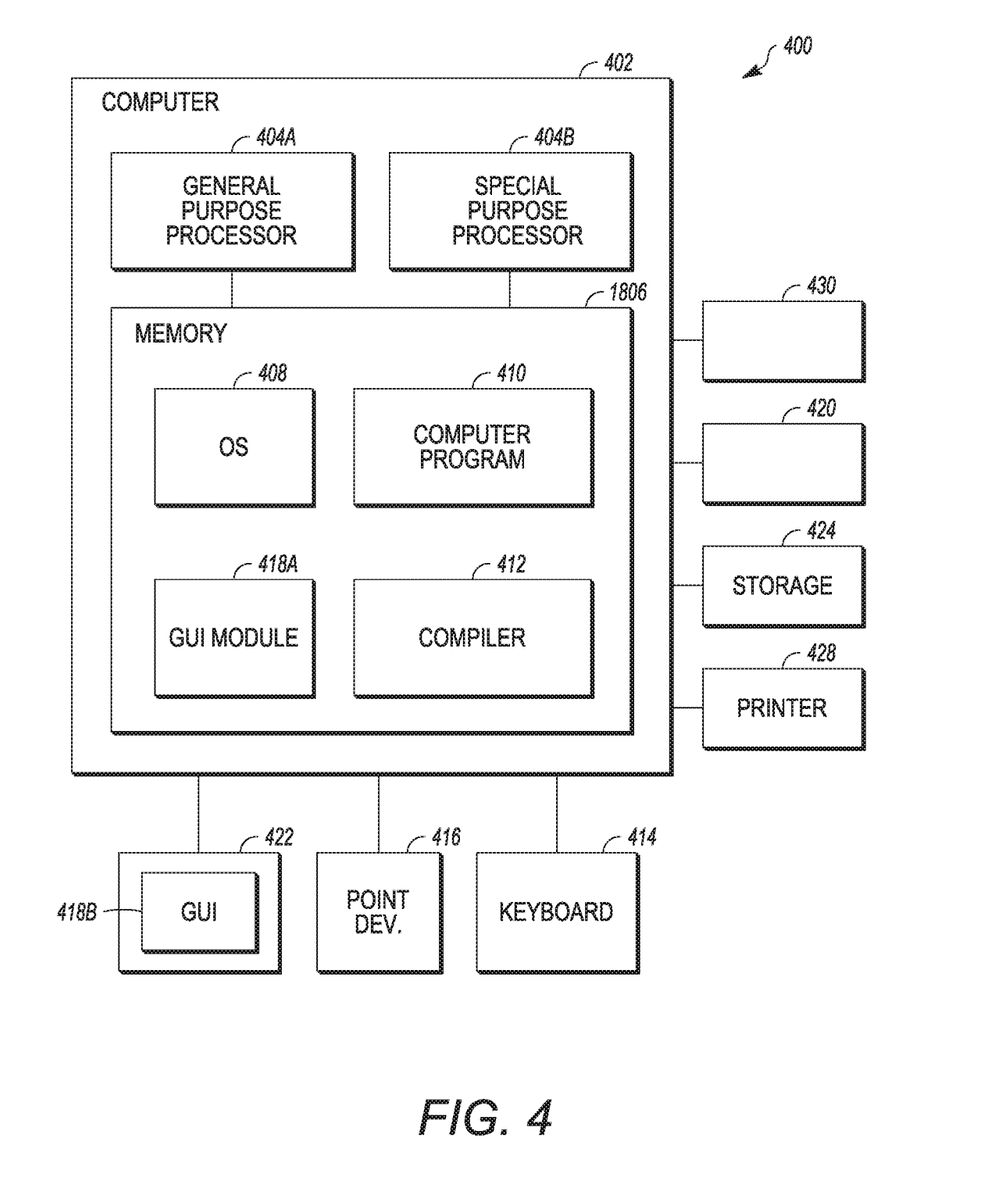
FIG. 4 illustrates an exemplary processing system that could be used to implement processing elements.

FIG. 4 illustrates an exemplary processing system 400 that could be used to implement processing elements of the above disclosure, including the receiver 108, display 114 or the processing elements of the service provider 102 and content/advertisement providers 106. The computer 402 comprises a processor 404 and a memory, such as random access memory (RAM) 406. The computer 402 is operatively coupled to a display 422, which presents images such as windows to the user on a graphical user interface 418B.

The computer 402 may be coupled to other devices, such as a keyboard 414, a mouse device 416, a printer 428, etc. Of course, those skilled in the art will recognize that any combination of the above components, or any number of different components, peripherals, and other devices, may be used with the computer 402.

Generally, the computer 402 operates under control of an operating system 408 stored in the memory 406, and interfaces with the user to accept inputs and commands and to present results through a graphical user interface (GUI) module 418A. Although the GUI module 418B is depicted as a separate module, the instructions performing the GUI functions can be resident or distributed in the operating system 408, the computer program 410, or implemented with special purpose memory and processors. The computer 402 also implements a compiler 412 which allows an application program 410 written in a programming language such as COBOL, C++, FORTRAN, or other language to be translated into processor 404 readable code. After completion, the application 410 accesses and manipulates data stored in the memory 406 of the computer 402 using the relationships and logic that was generated using the compiler 412. The computer 402 also optionally comprises an external communication device such as a modem, satellite link, Ethernet card, or other device for communicating with other computers.

In one embodiment, instructions implementing the operating system 408, the computer program 410, and the compiler 412 are tangibly embodied in a computer-readable medium, e.g., data storage device 420, which could include one or more fixed or removable data storage devices, such as a zip drive, floppy disc drive 424, hard drive, CD-ROM drive, tape drive, etc. Further, the operating system 408 and the computer program 410 are comprised of instructions which, when read and executed by the computer 402, causes the computer 402 to perform the operations herein described. Computer program 410 and/or operating instructions may also be tangibly embodied in memory 406 and/or data communications devices 430, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

For example, in the foregoing discussion, the metadata text tracks are used to preload advertisements to expedite processing. Metadata text tracks can also be used to target advertisements to different regions, for example, by including a "region" attribute in the metadata text track. In such cases, the receiver reads the text track at the appropriate cue times, and determines the region attribute matches the region in which the receiver is located and only preloads or shows the advertisement if the receiver is disposed in the appropriate region.

The use of metadata text tracks also makes it easier to replace advertisements in content that has been recorded by a digital video recorder. This can be accomplished, for example, by changing the advertisement disposed at the link described in the metadata text track.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of presenting an advertisement, comprising:
   receiving a video element of a media program having a metadata text track, the metadata text track having:
      a preload cue, having:
         a preload cue start time at which the advertisement is to be loaded for later presentation; and
         a link to the advertisement;
      a show cue, having:
         a show cue start time at which the advertisement is to be presented; and
         a show cue end time;
   providing the media program for display in a first window of a browser;
   determining when a current time of the video element reaches the preload cue start time;
   when the current time of the video element reaches the preload cue start time, retrieving and preloading the advertisement according to the link to the advertisement without providing the preloaded advertisement for display, the advertisement being preloaded in a second window of the browser for display at the show cue start time;
   determining when the current time of the video element reaches the show cue start time:
   when the current time of the video element reaches the show cue start time,
      determining if the advertisement has been preloaded:
         if the advertisement has been preloaded, providing the preloaded advertisement for display in the second window of the browser, wherein providing the advertisement for display comprises:
            determining that the advertisement is an interactive advertisement;
            determining if a user interacts with the advertisement beyond the show cue end time;
            if the user interacts with the advertisement beyond the show cue end time;
               initiating recording of the media program at the show cue end time;
               determining when the user has completed interacting with the advertisement;
               playing the recording of the media program;
            if the user does not interact with the advertisement beyond the show cue end time;
               closing the second window and present the media program at the show cue end time; and
         if the advertisement has not been preloaded, loading the advertisement according to the link to the advertisement and providing the advertisement for display.

2. The method of claim 1, wherein the advertisement is determined to be an interactive advertisement according to a tag of the metadata text track.

3. The method of claim 1, wherein determining when a current time of the video element reaches the preload cue start time comprises:
   subscribing to onenter and onexit events;
   determining that a onenter event has occurred;
   determining that the onenter event is the preload cue.

4. The method of claim 3, wherein the onenter event is determined to be the preload cue from a cue type of the metadata text track.

5. The method of claim 3, wherein determining when the current time of the video element reaches the show cue start time comprises:
   determining that another onenter event has occurred; and
   determining that the another onenter event is the show cue.

6. The method of claim 5, wherein the another onenter event is determined to be the show cue from a cue type of the text track.

7. The method of claim 1, further comprising:
   determining the current time from a time at which the providing of the media program for display commences and at least one of:
      program guide data describing a start time of the media program;
      a program time stamp of the media program; and
      program information messages.

8. An apparatus for presenting an advertisement, comprising:
   a processor;
   a memory, communicatively coupled to the processor, the memory storing processor instructions comprising processor instructions for:
      receiving a video element of a media program having a metadata text track, the metadata text track having:
         a preload cue, having:
            a preload cue start time at which the advertisement is to be loaded for later presentation; and
            a link to the advertisement;
         a show cue, having;
            a show cue start time at which the advertisement is to be presented; and
            a show cue end time;
      providing the media program for display in a first window of a browser;
      determining when a current time of the video element reaches the preload cue start time;
      when the current time of the video element reaches the preload cue start time, retrieving and preloading the advertisement according to the link to the advertisement without providing the preloaded advertisement for display, the advertisement being preloaded in a second window of the browser for display at the show cue start time;
      determining when the current time of the video element reaches the show cue start time;
      when the current time of the video element reaches the show cue start time,
         determining if the advertisement has been preloaded:
            if the advertisement has been preloaded, providing the preloaded advertisement for display in the second window of the browser, wherein providing the advertisement for display comprises:
               determining that the advertisement is an interactive advertisement;
               determining if a user interacts with the advertisement beyond the show cue end time;
               if the user interacts with the advertisement beyond the show cue end time;
                  initiating recording of the media program at the show cue end time;
                  determining when the user has completed interacting with the advertisement;
                  playing the recording of the media program;
               if the user does not interact with the advertisement beyond the show cue end time;
                  closing the second window and present the media program at the show cue end time; and
            if the advertisement has not been preloaded, loading the advertisement according to the link to the advertisement and providing the advertisement for display.

9. The apparatus of claim 8, wherein the advertisement is determined to be an interactive advertisement according to a tag of the metadata text track.

10. The apparatus of claim 8, wherein the instructions for determining when a current time of the video element reaches the preload cue start time comprise instructions for:
    subscribing to onenter and onexit events;
    determining that a onenter event has occurred;
    determining that the onenter event is the preload cue.

11. The apparatus of claim 10, wherein the onenter event is determined to be the preload cue from a cue type of the metadata text track.

12. The apparatus of claim 10, wherein the instructions for determining when the current time of the video element reaches the show cue start time comprise instructions for:
    determining that another onenter event has occurred; and
    determining that the another onenter event is the show cue.

13. The apparatus of claim 12, wherein the another onenter event is determined to be the show cue from a cue type of the text track.

14. The apparatus of claim 8, wherein the instructions further comprise instructions for:
    determining the current time from a time at which the providing of the media program for display commences and at least one of:
       program guide data describing a start time of the media program;
       a program time stamp of the media program; and
       program information messages.

15. The apparatus of claim 8, wherein:
    the preload cue further comprises an attribute describing a receiver class to which the preload cue pertains;
    the retrieving and preloading of the advertisement commences at the preload cue start time only if the attribute describing the receiver class matches a class of the receiver in which the video element is received.

16. An apparatus for presenting an advertisement, comprising:
    a receiver, the receiver configured to:
       receive a video element of a media program having a metadata text track, the metadata text track having:
          a preload cue, having:
             a preload cue start time at which the advertisement is to be loaded for later presentation; and
             a link to the advertisement;
          a show cue, having;
             a show cue start time at which the advertisement is to be presented; and
             a show cue end time;

a processor, the processor configured to:
provide the media program for display in a first window of a browser;
determine when a current time of the video element reaches the preload cue start time;
retrieve and preload the advertisement according to the link to the advertisement without providing the preloaded advertisement for display when the current time of the video element reaches the preload cue start time, the advertisement being preloaded in a second window of the browser;
determine when the current time of the video element reaches the show cue start time:
determine if the advertisement has been preloaded when the current time of the video element reaches the show cue start time:
provide the preloaded advertisement for display if the advertisement has been preloaded in the second window of the browser, wherein providing the advertisement for display the processor is configured to:
determine that the advertisement is an interactive advertisement;
determine if a user interacts with the advertisement beyond the show cue end time and if the user interacts with the advertisement beyond the show cue end time;
initiate recording of the media program at the show cue end time;
determine when the user has completed interacting with the advertisement;
play the recording of the media program;
determine if a user interacts with the advertisement beyond the show cue end time and if the user does not interact with the advertisement beyond the show cue end time;
close the second window and present the media program at the show cue end time; and
load the advertisement according to the link to the advertisement and providing the advertisement for display if the advertisement has not been preloaded.

* * * * *